United States Patent
Krupezevic et al.

(10) Patent No.: US 7,092,687 B2
(45) Date of Patent: Aug. 15, 2006

(54) FIVE-PORT TOPOLOGY FOR DIRECT DOWN-CONVERSION

(75) Inventors: Dragan Krupezevic, Stuttgart (DE);
Mohamed Ratni, Esslingen (DE);
Veselin Brankovic, Esslingen (DE)

(73) Assignee: SONY International (Europe) GmbH, Berlin (DE)

( * ) Notice: Subject to any disclaimer, the term of this patent is extended or adjusted under 35 U.S.C. 154(b) by 417 days.

(21) Appl. No.: 10/346,800

(22) Filed: Jan. 17, 2003

(65) Prior Publication Data

US 2004/0002322 A1    Jan. 1, 2004

(30) Foreign Application Priority Data

Jan. 18, 2002   (EP) .................................. 02001376

(51) Int. Cl.
*H04B 17/02*   (2006.01)
*H04B 1/18*    (2006.01)
*H04B 1/26*    (2006.01)

(52) U.S. Cl. ................... 455/131; 455/136; 455/189.1; 455/190.1; 455/318; 332/138; 329/302; 329/306

(58) Field of Classification Search ............... 455/323, 455/325, 313, 326, 327, 328; 375/316; 329/304, 329/306

See application file for complete search history.

(56) References Cited

U.S. PATENT DOCUMENTS

| | | | |
|---|---|---|---|
| 5,498,969 A | | 3/1996 | Huyart et al. |
| 5,940,750 A | * | 8/1999 | Wang .......................... 455/318 |
| 6,600,913 B1 | * | 7/2003 | Brankovic et al. .......... 455/324 |
| 6,650,178 B1 | * | 11/2003 | Brankovic et al. .......... 329/304 |
| 2002/0131480 A1 | * | 9/2002 | Sousa et al. ................. 375/147 |

FOREIGN PATENT DOCUMENTS

WO    WO 99 33166    7/1999

* cited by examiner

*Primary Examiner*—Edward F. Urban
*Assistant Examiner*—Thuan T. Nguyen
(74) *Attorney, Agent, or Firm*—Oblon, Spivak, McClelland, Maier & Neustadt, P.C.

(57) ABSTRACT

An apparatus for a direct down-conversion of modulated RF signals, the device including: a first power detector connected between an input port for the modulated RF signal and ground, which outputs a first DC signal, a second power detector connected between an input port for a local oscillator signal and ground, which outputs a second DC signal, the local oscillator signal having the same center frequency as the modulated RF signal, and a third power detector connected between the input port for the modulated RF signal and the input port for the local oscillator signal, which outputs a third DC signal.

9 Claims, 16 Drawing Sheets

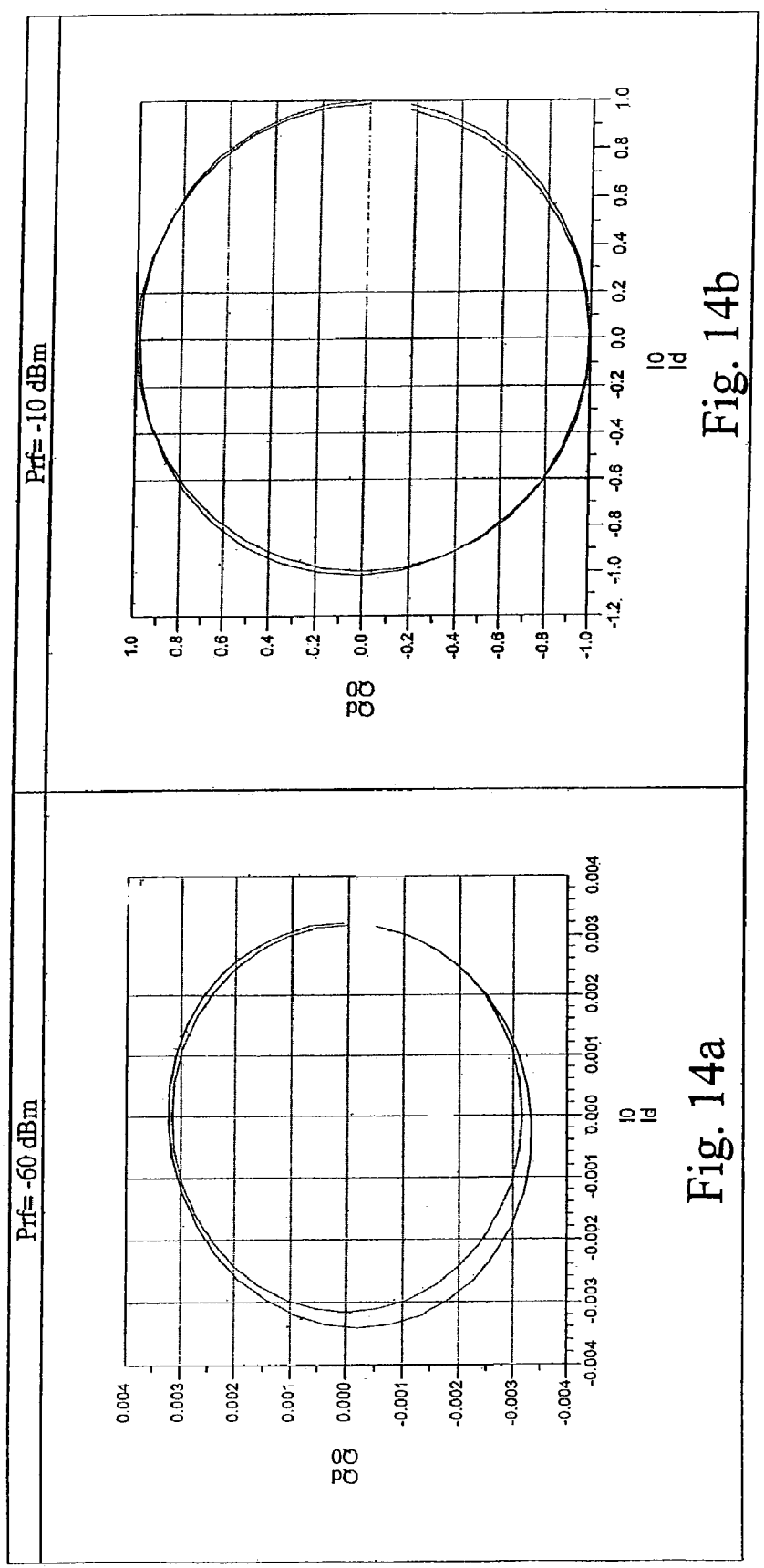

FIVE-PORT TOPOLOGY FOR DIRECT DOWN-CONVERSION

FIELD AND BACKGROUND OF THE INVENTION

The underlying invention generally relates to the field of five-port receivers, especially to a new topology for a five-port junction device with three power sensors to be applied to the processing and direct down-conversion of broadband RF signals i.e. within an operation bandwidth between 1 and 7 GHz. Thereby, said receiver does not need additional passive (resistive) network, which leads to a significant increase in the overall signal-to-noise (S/N) performance. Compared to receivers with a resistive five-port topology according to the state of the art, a non-optimized structure sensitivity enhancement (system gain) of 8–9 dB can be observed. Since a simpler technology is employed, a significant decrease in microchip size (of more than 50%) can be achieved.

Six-port technology can be used for the processing of RF signals, thereby allowing a direct down-conversion from millimeter-wave range and microwave range to the base band without needing any I/Q demodulation microchip (digital or analog). By using suitable calibration procedures, the influences of the non-ideal passive RF components—including manufacturing tolerances—can be minimized. A six-port receiver detects the relative phase and relative magnitude of two incoming RF signals. Its circuitry can be realized by passive components in combination with diodes for the detection of the relative phase and the relative amplitude of the RF signals. In this context, it should be mentioned that an important feature of six-port receivers consists in the possibility of calibrating fabrication tolerances, which inherently allows low-cost production.

BRIEF DESCRIPTION OF THE PRESENT STATE OF THE ART

According to the state of the art, there are different methods to the problem of RF down-conversion, each of them being optimized to a specific application environment. In order to explain these solutions, it is necessary to briefly describe some of their characterizing features.

Six-port receivers as disclosed in the European patent application EP-A-0 896 455 are known for accurately measuring both amplitude and phase of the scattering parameters in a microwave network and enabling a direct down-conversion of modulated RF signals from millimeter wave and microwave range to the baseband. Thereby, a six-port receiver detects the phase difference and the amplitude ratio of two incoming RF signals by using the information of superimposed, mutually interfering RF signals. To perform the down-conversion of the modulated RF signals, a classical I/Q demodulator is not needed. With the aid of suitable calibration procedures, the influence of non-ideal linear RF components (including manufacturing tolerances of these components) can be minimized. The circuitry of six-port receivers can be realized by only employing passive components in combination with power sensors for the detection of the phase difference and the amplitude ratio of said RF signals. An important feature of six-port receivers is that fabrication tolerances of the employed RF components can be calibrated, which inherently allows the usage of low-cost RF components.

A structure for a six-port receiver is proposed in the IEEE MTT Symposium report "A Six-Port Direct Digital Millimeter Wave Receiver" (Vol. 3, pp. 1659 to 1662, San Diego, May 1994) by Ji Li, R. G. Bossisio and Ke Wu. Therein, a novel scheme for a digital phase demodulation of modulated millimeter and microwave waves by means of a six-port receiver is presented. Due to said scheme some disadvantages of conventional receivers, wherein I/Q demodulators are used for a direct down-conversion of the received RF signals, are overcome.

Said six-port technique has been known for its ability to accurately measure the scattering parameters of microwave networks (both amplitude and phase). Instead of using heterodyne receivers, a six-port receiver accomplishes direct measurements at microwave and millimeter-wave frequencies by extracting power levels at three or more (particularly four) of the six-ports. The imperfections of the underlying hardware can readily be eliminated by an appropriate calibration procedure. Very accurate measurements can be made in a large dynamic range and a wide frequency range. Six-port junction receivers consist of passive microwave components such as directional couplers and power dividers as well as diode detectors. Their circuits can easily be integrated as Miniature Hybrid Microwave Integrated Circuits (MHMICs) or Microwave Monolithic Integrated Circuits (MMICs). Thereby, the receiver must be able to perform a direct phase and/or amplitude demodulation at microwave and millimeter-wave frequencies.

By performing a calibration procedure, the hardware imperfections (such as the phase error of the bridges, the imbalance of the power detectors, etc.) can readily be eliminated. This significantly eases the requirement of the hardware implementation and enables the six-port receiver to operate over a wide band up to millimeter-wave frequencies.

According to the above-cited document "A Six-Port Direct Digital Millimeter Wave Receiver" (Digest of the IEEE MTT Symposium, Vol. 3, pp. 1659 to 1662, San Diego, May 1994) by Ji Li, R. G. Bossisio and Ke Wu, a six-port receiver concept with power dividers and 90° hybrid circuits realized in distributed technology has already been deployed. The usage of this well-known structure lies mainly in frequency bands above 10 GHz. However, said receiver suffers from an insufficient operation bandwidth due to the inherently frequency-selective nature of the 90° hybrid circuits.

From the European patent application EP 0 957 573 A1, a five-port junction device is disclosed which can be used for processing received RF signals in order to perform a direct down-conversion of said RF signals. The device comprises a passive four-port network being connected with a passive three-port network by means of a phase shifter. Thereby, one port of said passive four-port network acts as an input port used for the input of a first RF signal, and two ports of said passive four-port network act as output ports. The passive three-port comprises one port used for the input of a second RF signal and one output port. In the disclosed topology, a passive isolation is provided. In this case, at least two phase shifters are applied along with four passive structures, which provide a signal splitting and combine functional features. The output ports respectively provide output signals which can be obtained as linear combinations of the first and the second RF signal. Three power sensors, each connected to one of said three output ports and a digital signal processor (DSP), serve to detect the respective power levels of the obtained output signals. The DSP is provided to calculate the complex ratio of the first and the second RF signal on the basis of the three power levels ($P_1$, $P_2$ and $P_3$) detected by the power sensors.

The PCT patent application PCT/EP98/08329 refers to an N-port junction device (with N≧4) used in the receiver of a mobile telecommunications device for processing modulated RF signals comprising two RF input ports, two passive signal combining units connected to each other by means of a phase shifting element, wherein the first one of said passive signal combining units is fed with a first RF input signal and the second one of said passive signal combining units is fed with a second RF input signal. Additionally, said N-port junction device comprises at least two power sensors, each connected to one of the output ports of said passive signal combining units.

From "CPW Millimeter-Wave Six-Port Reflectometers using MHMIC and MMIC Technologies" (European Microwave Conference 1994, pp. 911 to 915) by D. Maurin, Y. Xu, B. Huyart, Ke Wu, M. Cuhaci and R. G. Bossisio, a wide-band topology for a reflectometer is known which is based on a distributing element approach featuring coplanar waveguide applications in the frequency range between 11 and 25 GHz.

In "A New Extremely Wideband Lumped Six-Port Reflectometer" (European Microwave Conference 1991, pp. 1473 to 1477) by V. Bilik et al., the idea of using Wheatstone Bridges and resistive structures for reflectometer applications is described.

From "Dual-Tone Calibration of a Six-Port Junction and its Application to the Six-Port Direct Digital Receiver" (IEEE Transactions on Microwave Theory and Techniques, Vol. 40, January 1996) by Ji Li, R. G. Bossisio and Ke Wu, a six-port reflectometer topology based on four 3-dB hybrid circuits, power dividers, and attenuators is known.

From the U.S. Pat. No. 5,498,969, an asymmetrical topology for a reflectometer structure featuring matched detectors and one unmatched detector is known.

In the U.S. Pat. No. 4,521,728 with the title "Method and Six-Port Network for Use in Determining Complex Reflection Coefficients of Microwave Networks", a reflectometer six-port topology comprising two different quadrate hybrids, phase shifters, two power dividers and one directional coupler is described, for which a realization with a microstrip line technology is disclosed.

From the European patent application EP-A-0 805 561, a method for implementing a direct-conversion receiver with a six-port junction device is known. According to this known technique, modulated transmitted modulation is received by a direct-conversion receiver which comprises a six-port junction device. Thereby, the receiver performs an analog demodulation.

From the European patent application EP-A-0 841 756, a correlator circuit for a six-port receiver is known. In this circuit, the received signal is summed up with a local oscillator signal at various phase angles, wherein the phase rotation between the LO signal and the RF signals is separately carried out by using the sum of the correlator outputs.

In the approaches according to the state of the art mentioned above, a five-port or six-port junction is considered
- as a structure with a perfect matching,
- as a structure that contains different sub-parts with a resistive or reactive power splitting functionality, and
- as a structure that may comprise at least one resistive power divider with an isolation function.

For all of these cases, it shall be assumed that the power detector structures are ideally matched. In reality however, due to the manufacturing process, the passive and active parts react in such a way that the ideal functionality of the sub-parts is not fulfilled, which means that a calibration procedure is necessary to cope with this problem.

In the prior art, in order to ensure broadband matching (for multi-system applications), a resistive type of power splitters and directive couplers is proposed rather than a reactive type of said structures. The main drawback of the proposed solutions is that the introduction of resistive power division elements involves an inherent signal attenuation, which reflects the overall performance of the applied I/Q demodulator as far as its signal-to-noise ratio (S/N) is concerned. Moreover, in the previously proposed solutions mentioned above, a phase-shifting functionality can be applied, which is usually realized by a Π-type network topology with two capacitors and one inductor, or by using a transmission line.

OBJECT OF THE UNDERLYING INVENTION

In view of the above explanations it is the object of the invention to propose a novel low-cost and small-size approach for a receiver network topology applied to a wireless receiver system for the processing and direct down-conversion of broadband RF signals which does not need any additional passive (resistive) network or phase shifting elements.

This object is achieved by means of the features in the independent patent claims. Advantageous features are defined in the dependent patent claims.

SUMMARY OF THE INVENTION

The underlying invention describes a small-size solution for a five-port network topology of a mobile radio receiver used for the demodulation of modulated RF signals which can easily be integrated on a microchip. It is basically dedicated to the idea of providing a new topology for a five-port receiver with three power sensors to be applied to the processing and direct down-conversion of broadband RF signals within an operation bandwidth of i.e. 1 to 7 GHz, presenting the following features:

Said five-port receiver does not apply any passive (resistive) network, which leads to a significantly increased sensitivity level and a significant enhancement in the overall signal-to-noise (S/N) performance. Compared to the resistive five-port topology according to the state of the art, a non-optimized structure sensitivity enhancement (system gain) of 8–9 dB can be observed.

Since a simpler technology is employed (with no inherent need for any transmission line or inductor that is difficult to realize when taking into account severe space requirements), a significant decrease in microchip size (of more than 50%) can be achieved.

The proposed solution according to the underlying invention significantly exceeds conventional five-port topology. Its features are to connect power detectors in a Π-type network topology and to place reactive devices between the upper connection nodes of said network. The actual matching of the power detectors does not play a significant role due to the calibration procedure. Thus, the main issue is how to get the highest possible power with minimum losses to the detector sources while approving the same method of phase shifting. In this context, it is interesting that the phase difference may be sufficient due to the actual components of the power detectors.

In the scope of the underlying invention, a five-port topology without any directive couplers (realized as resistive components) and without an inherent need for phase shifters shall be introduced, whereby a significant simplification of the structure and a more effective solution with an increased sensitivity level is enabled.

BRIEF DESCRIPTION OF THE CLAIMS

The independent claim 1 and the dependent claims 2 to 9 refer to a device for a direct down-conversion of modulated RF signals. It comprises two input ports, three power detectors and three output ports. Thereby, the first power detector is connected between an input port for the modulated RF signal and ground and outputs a first DC signal. The second power detector is connected between an input port for a local oscillator (LO) signal and ground and outputs a second DC signal, in which the local oscillator (LO) signal has the same center frequency as the modulated RF signal. Finally, the third power detector is connected between the input port for the modulated RF signal and the input port for the local oscillator (LO) signal and outputs a third DC signal.

BRIEF DESCRIPTION OF THE DRAWINGS

Further advantages of the underlying invention result from the subordinate claims as well as from the following description of two preferred embodiments of the invention which are depicted in the following drawings. Herein, FIG. 1 exhibits a first embodiment of a five-port topology according to the underlying invention, FIGS. 2a–g present seven circuitries showing different connection possibilities between the two upper nodes (A and B) of said five-port junction device.

DETAILED DESCRIPTION OF THE UNDERLYING INVENTION

In the following, the underlying invention as depicted in FIGS. 1 to 14 shall be explained in detail. The meaning of the symbols designated with reference signs in FIGS. 1 to 14 can be taken from the appended table of reference signs.

Figure 1:
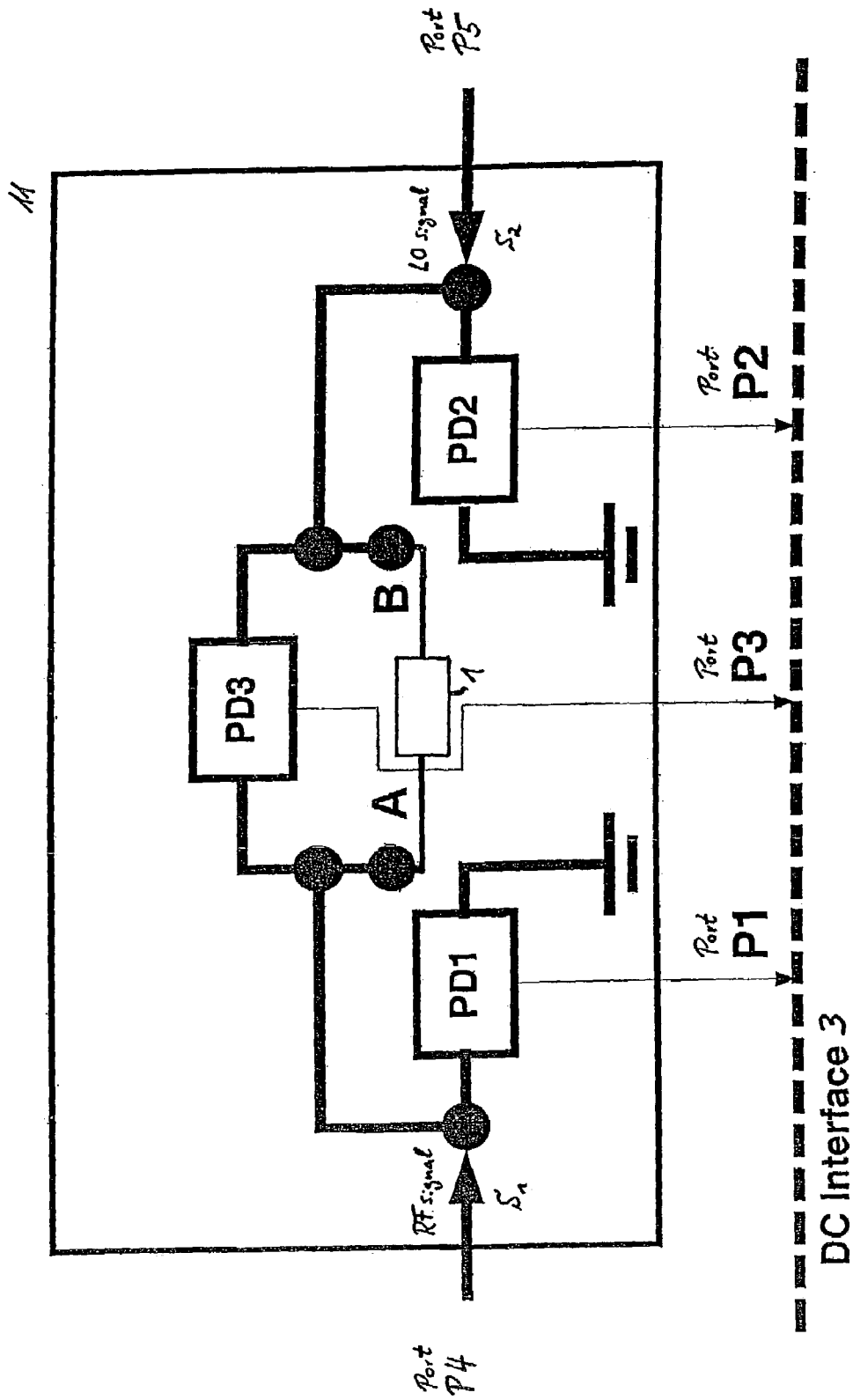

The proposed five-port structure according to the underlying invention exhibits three functional blocks serving as power detectors PD1, PD2 and PD3 which are connected as depicted in FIG. 1. Its input ports are P4 and P5, and its output ports are P1, P2 and P3. Thereby, the output signals of the power detectors at P1, P2, and P3 are DC signals (baseband-modulated). Two connection ports at the nodes A and B are connected to a passive circuitry block 1.

According to FIGS. 2a–g, said passive circuitry block 1 may contain the following components placed between the nodes A and B:
a) no passive device (cf. FIG. 2a),
b) one simple resistor R (cf. FIG. 2b),
c) one simple capacitor C (cf. FIG. 2c),
d) one inductor (L) and one capacitor C or two capacitors $C_1$ and $C_2$ (cf. FIG. 2d),
e) two inductors, e.g. $L_1=L_2=L$, and one capacitor C (cf. FIG. 2e),
f) a combination of two or more parallel and/or series-connected resistors, capacitors and/or inductors, e.g. one resistor R and one capacitor C (cf. FIG. 2f), or
g) a transmission line of a specific length, which is usually placed outside of the microchip (cf. FIG. 2g).

The power sensors PD1, PD2 and PD3 may be realized as power detectors according to any solution depicted in FIGS. 6a–d, or by other means. It should be noted that special care has to be taken for the realization of the power sensor PD3 placed between the nodes A and B as no simple ground connection is provided.

Figure 6A:
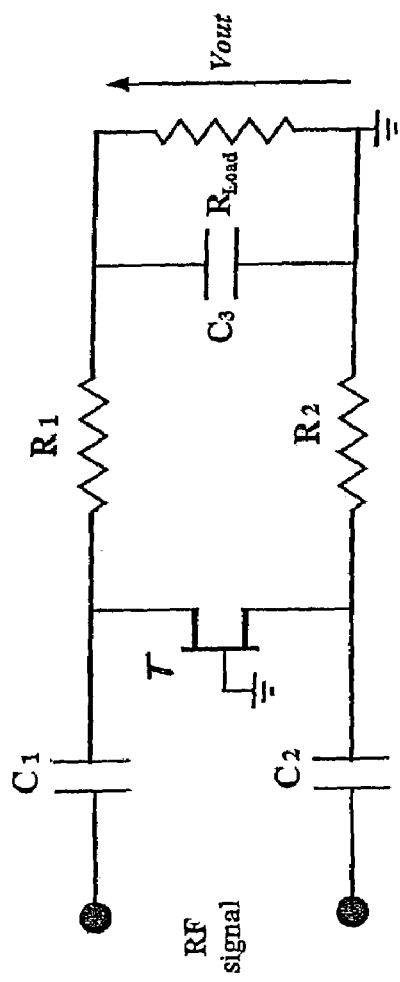
FIGS. 6a–d present four circuitries showing different functional options for the employed power detectors (sensors)
Figure 6B:
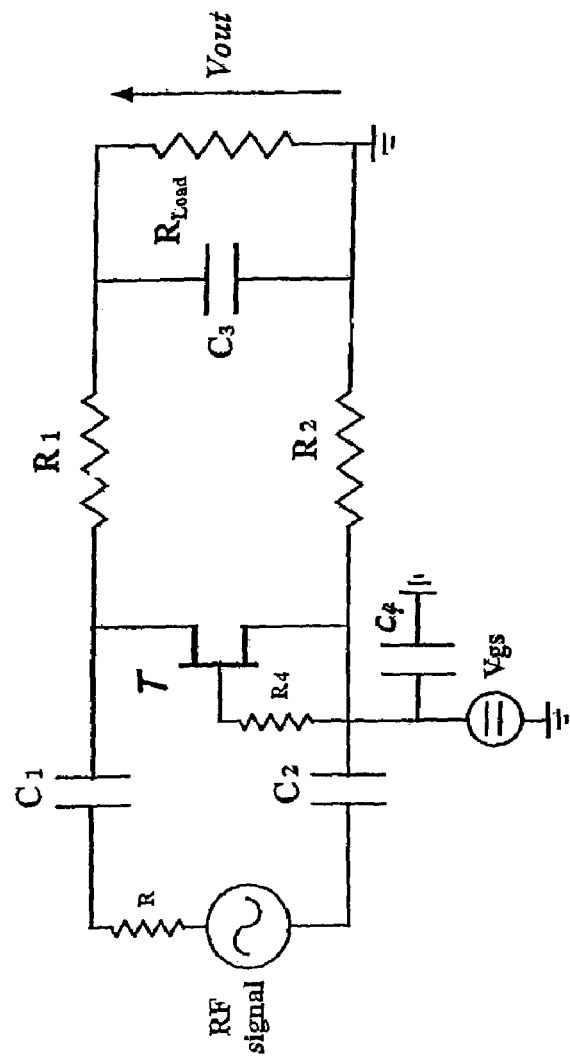
Figure 6C:
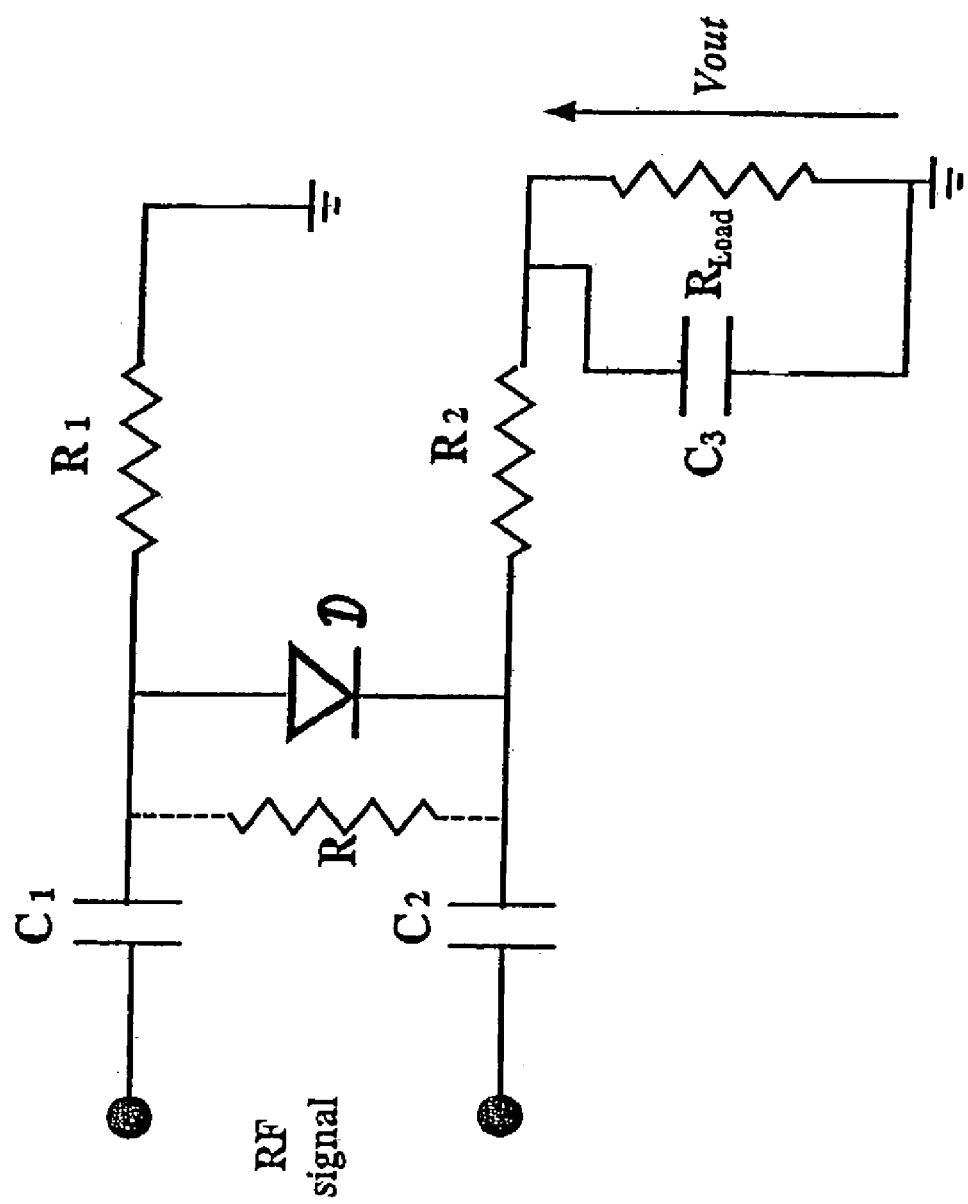
Figure 6D:
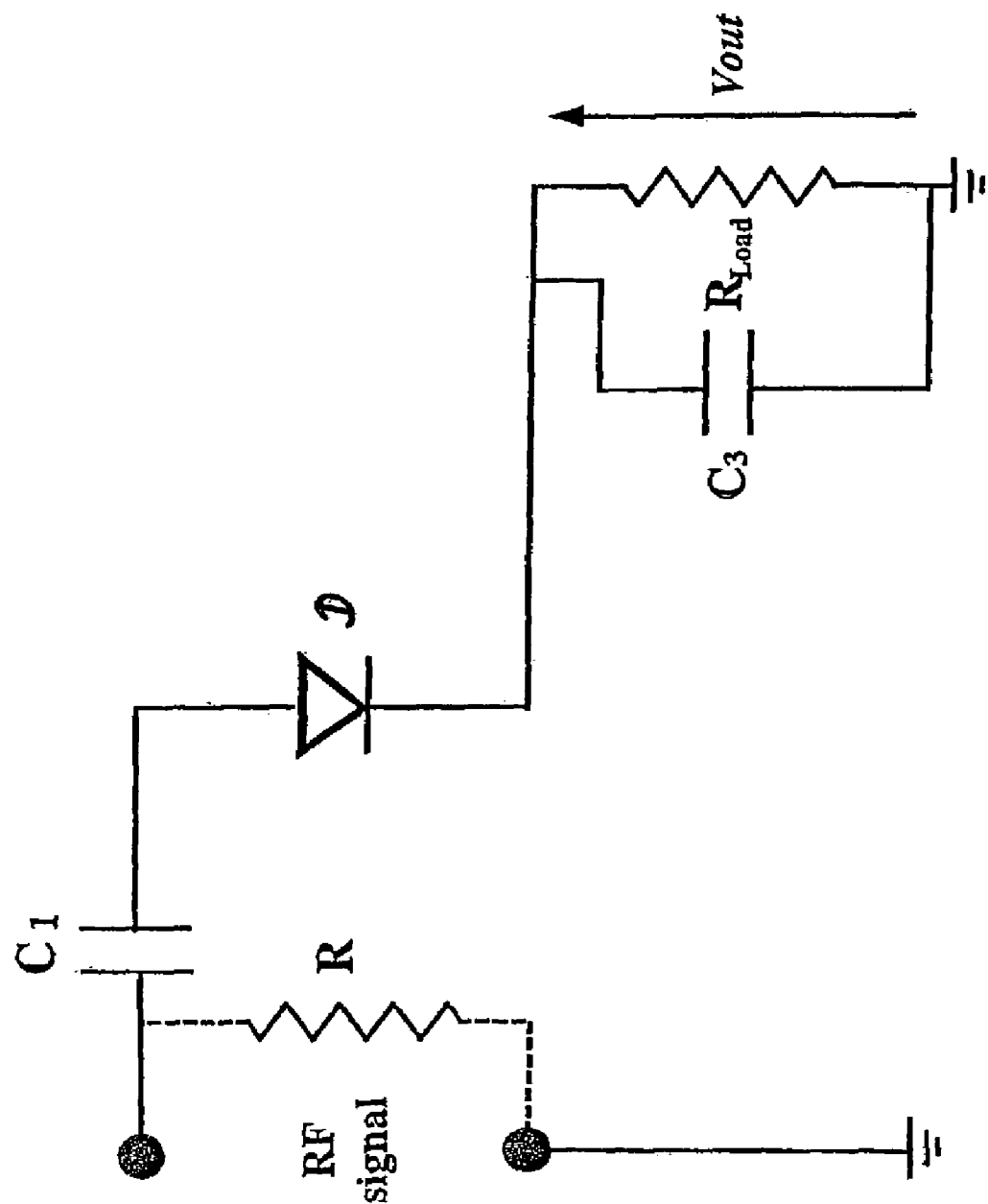

The circuitries proposed in FIGS. 2a and 2b are only possible for special cases in which power detectors PD1, PD2 and PD3 that contain reactive elements are employed. Preferably, for the sake of sensitivity, the best results are achieved when instead of a resistor R as depicted in FIG. 2b no passive component is placed between the nodes A and B as depicted in FIG. 2a. It should be noted that this is only possible if real (non-ideal) power sensors are applied. Furthermore, it should be noted that in case a power detector with an active component is used, e.g. a GaAs Junction Field Effect Transistor (J-FET) as depicted in FIGS. 6a+b, it inherently has capacity elements ($C_1$ and $C_2$) at the input ports, and a non-symmetrical structure. This allows a realization option in which no specific passive components are placed between the nodes A and B.

At the output ports P1, P2 and P3 of the power detectors PD1, PD2 and PD3, three DC signals are detected, which are then provided at the DC interface. These signals are submitted to a bank of DC amplifiers 4 and low-pass filters 2, for which a plurality of realization means exist. Preferably, first low-pass filtering and then DC amplification is performed. The control unit 5 may have optional capability of adjusting the levels of the variable gain amplifiers 4 used for DC amplification. From this point of view, there are three possible options for a hardware realization with different topologies as depicted in FIGS. 3, 4 and 5.

Figure 3:
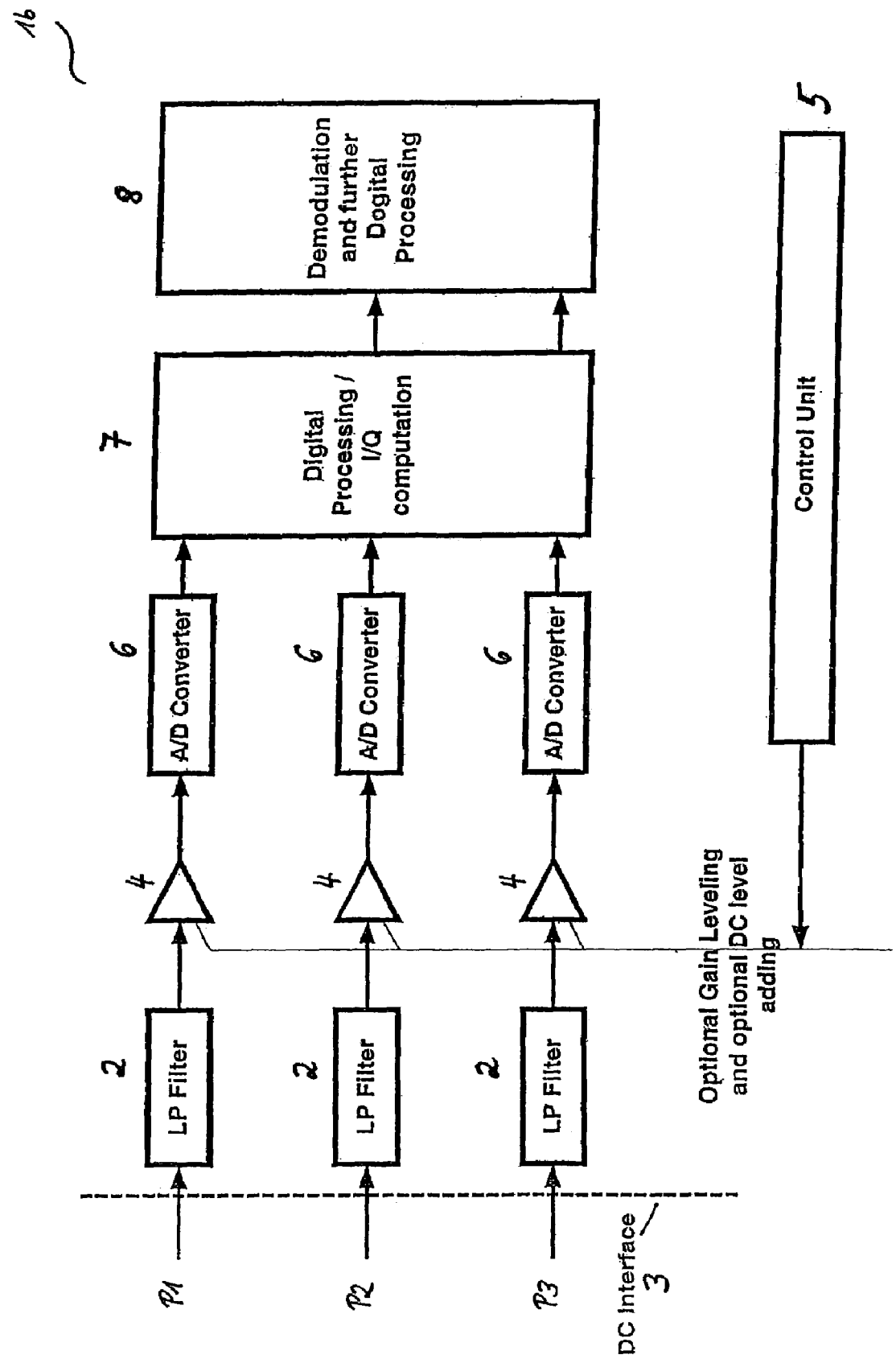
FIG. 3 shows a first embodiment of a circuitry block attached to the DC interface depicted in FIG. 1.

FIG. 3 shows a simple first embodiment for the realization of the power sensors PD1, PD2 and PD3 used for an I/Q demodulation as depicted in FIG. 1, in which after the low-pass filtering stages 2 and DC amplification stages 4 three A/D converters 6 are placed. The digital data are captured, and a calculation of the I/Q values is performed, thereby using a mathematical processing of three inputs. After having performed the I/Q demodulation, the actual demodulation of the signals may follow. In this context, it should be noted that at least eight constants are involved in the process of said mathematical process—four for the computation of the in-phase signal (I) and four for the computation of the quadrature signal (Q). These values must be provided for said computation; they refer to the realization of the structure as depicted in FIG. 1 (including the realization and method of operation of the power sensors PD1, PD2 and PD3 and their manufacturing impacts). The key feature of this five-port junction device 11 is that those constants may be stored in a memory and used for different calculations, and that the actual value of those constants may be provided by a calibration procedure. Said calibration procedure may be done once after the manufacturing process, and then those constants are fixed. Alternatively, said constants may be changed in order to compensate the temperature or some other RF-related impacts which are changing while said technology is applied. Ideally, the baseband processing unit 7 has thus a capability to use different constants, which are related to different frequencies of operation or different environmental influences.

Figure 4:
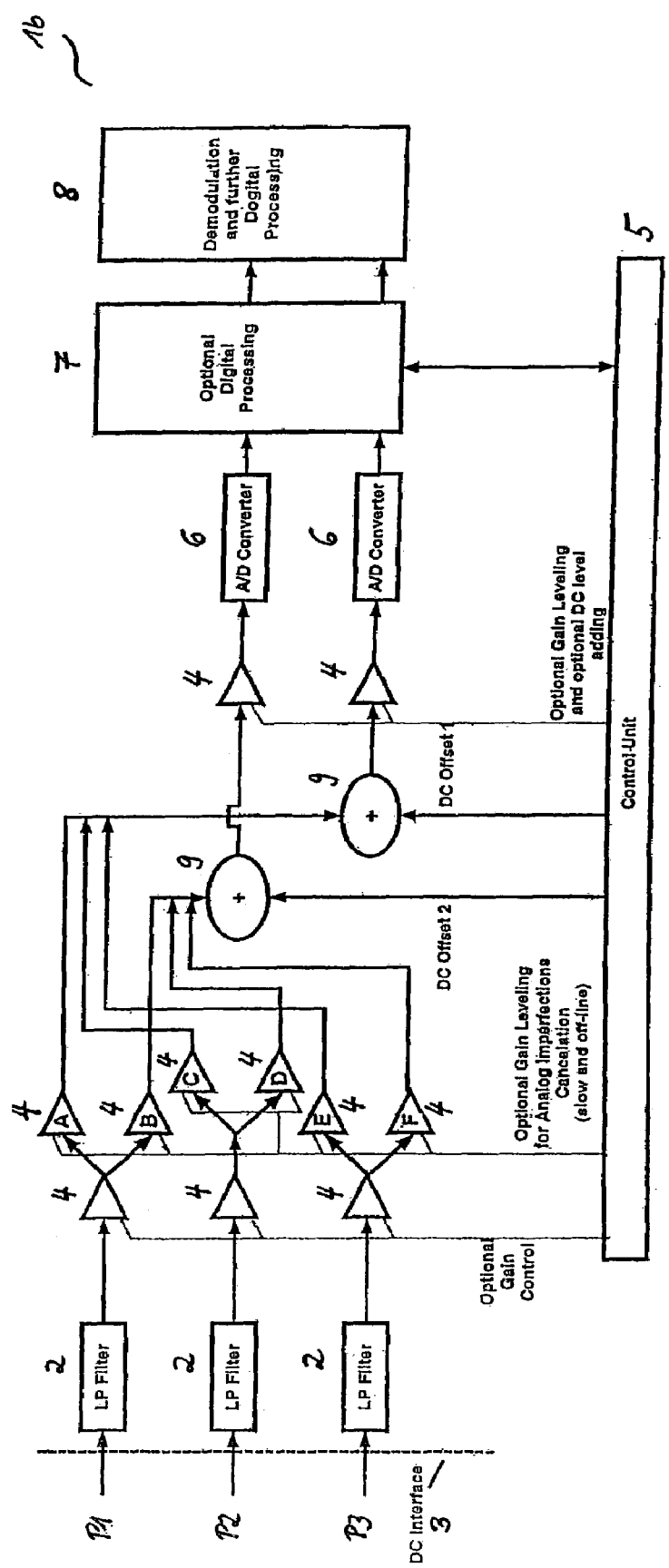
FIG. 4 shows a second embodiment of the circuitry block attached to said DC interface.

In FIG. 4, a second embodiment for the I/Q demodulation is disclosed. The main difference to the solution depicted in FIG. 3 is that all of the three power sensor inputs are multiplied (after being submitted to low-pass filtering stages 2 and optional DC amplification stages 4) with specific real numbers (A, B, C, D, E and F), which may also take negative values. Then, two sets of three values each are added to a specific DC signal value by a summation element stage 9. After that, these values are fed to an optional operation amplifier stage 4 before approaching the A/D converter stage 6. It may be stated that this approach has two advantages, compared to the embodiment depicted in FIG. 3: It only encompasses two A/D converters 6, and the multiplication of the signals (I/Q computation) by the real values A, B, C, D, E and F is done analogically, thereby offering a significant saving in power consumption compared to the digital approach. Preferably, the control signals 5a–c for adjusting the amplification gains of the amplifiers 4 have to be provided by the control unit 5 in order to manage the change of said gains. This means a significant increase of the analog hardware complexity. On the other hand, e.g. if the complete five-port junction device 11 is realized in CMOS technology, the means for controlling the gain of operation amplifiers 4 to cope with device tolerances may be similar to those required for a specific gain control as depicted in FIG. 4.

Figure 5:
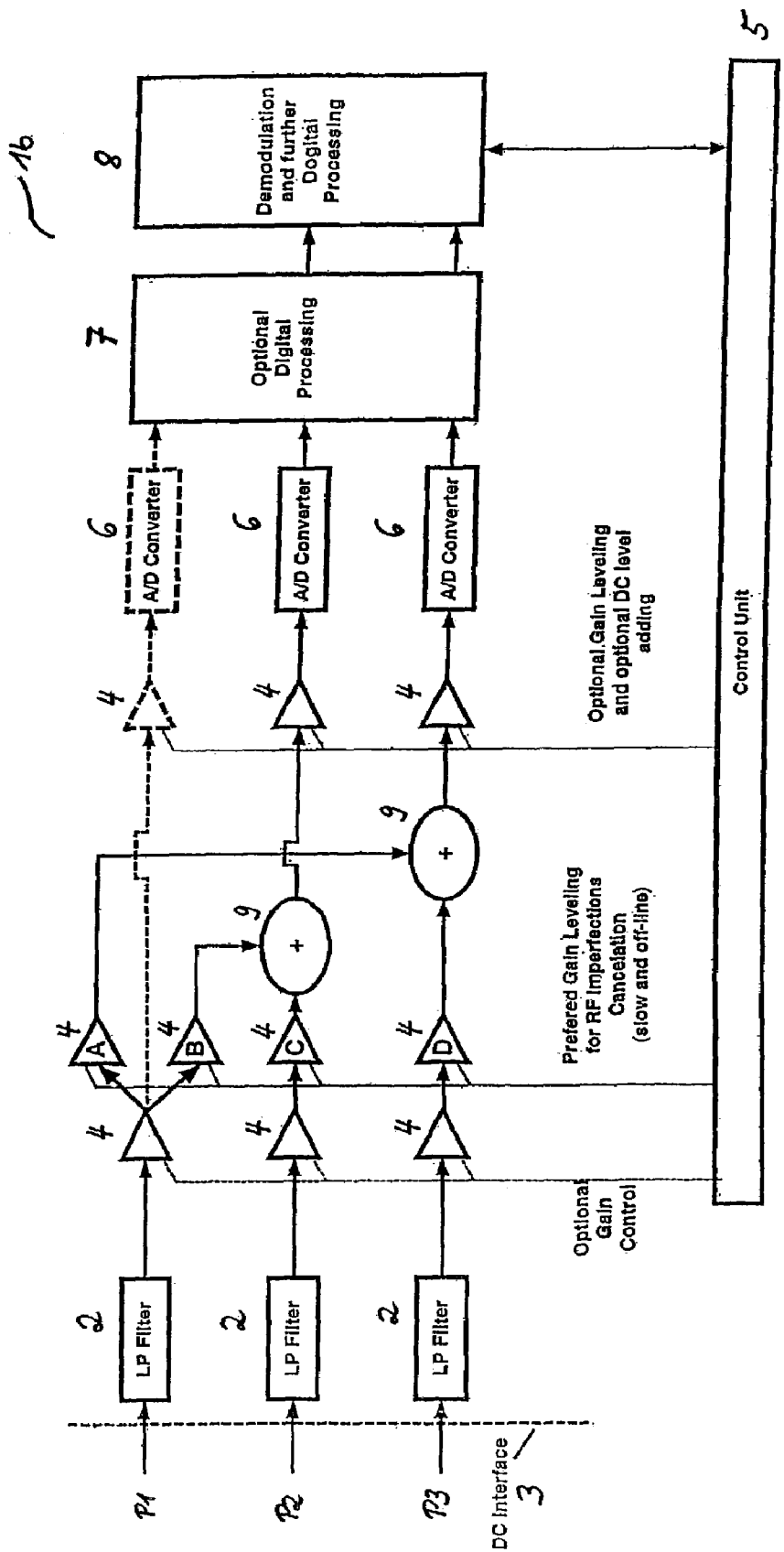
FIG. 5 shows a third embodiment of the circuitry block attached to said DC interface.

FIG. 5 shows a hybrid solution, based on the solutions depicted in FIGS. 3 and 4, in which the low-pass filtered and amplified values of the ports P1, P2 and P3 are added and provided to an amplification stage 4 and an A/D converter stage 6. Optionally, a power converter may be added. This approach mixes both analog and digital solutions in the process of the I/Q computation. It should be noted that the values for the amplification coefficients (which do not depend on the digital or analog processing) are defined after having performed the calibration procedure explained below.

Figure 2:
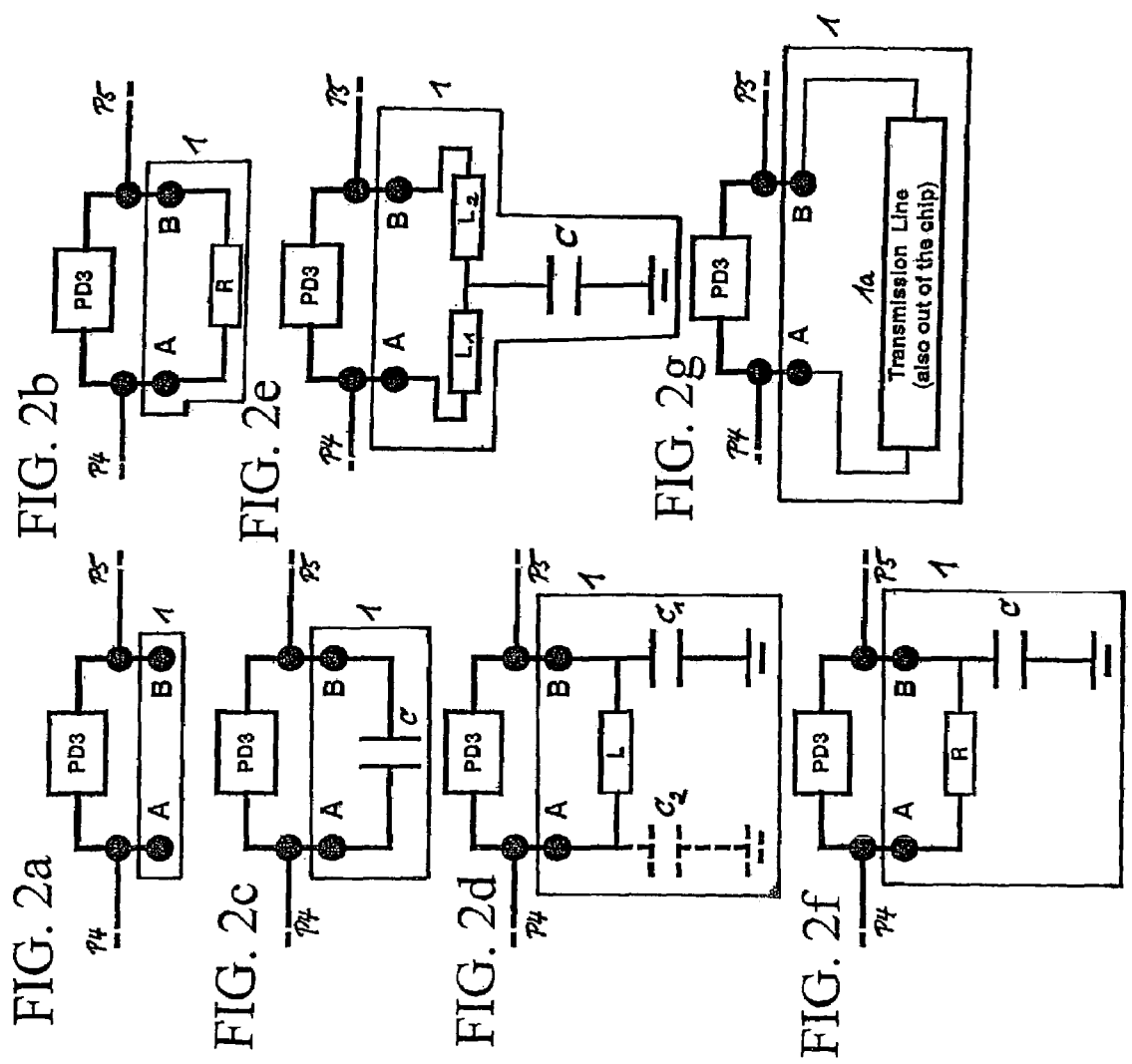
FIG. 2), which uses a simple capacitor $C_3$ between the nodes A and B.

The basic method of operation is that the I/Q-modulated RF signal is fed to the first input port (P4) of the five-port junction device 11 depicted in the FIG. 2. This signal is present at the input port P4 of the power sensor PD1, at the ports A and B of power sensor PD3, and simultaneously at the input port P5 of power sensor PD2. The same applies to the LO signal which is placed at the same carrier frequency and fed to port P5. In this context, it should be noted that due to the realization of the power sensors PD1, PD2 and PD3, and due to the kind of electrical components connected to the ports A and B according to FIGS. 2a–g, different portions of the modulated RF signal $S_1$ and the LO signal $S_2$ are provided at the input ports of said power detectors PD1, PD2 and PD3. These two signals are than superimposed, thereby taking into account the variety of relative phase differences.

Principally, the power detectors PD1, PD2 and PD3 "read" the power levels of different linear complex combinations of the LO signal and the modulated RF signal. Since three power values are known (on the assumption that the power of the LO signal $S_2$ injected into the circuitry is constant and not necessarily known), the I/Q values of the modulated RF signal $S_1$ can be calculated by digital means, by analog means or by hybrid means (cf. FIGS. 4, 5 and 6a–d). Thereby, the calculation of the I/Q values is performed by using the following equations:

$$I = h_{I0} + h_{I1} \cdot P_1 + h_{I2} \cdot P_2 + h_{I3} \cdot P_3, \quad (1)$$

$$Q = h_{Q0} + h_{Q1} \cdot P_1 + h_{Q2} \cdot P_2 + h_{Q3} \cdot P_3, \quad (2)$$

with $P_1$: power level of the RF signal detected at port P1,
$P_2$: power level of the RF signal detected at port P2,
$P_3$: power level of the RF signal detected at port P3.

From these equations, it can be taken that eight coefficients are needed to calculate the I and Q values. For example, these coefficients may directly be seen in FIG. 5, wherein different gains are addressed to the power values of the low-pass filtered signals at the ports P1, P2 and P3.

In the case depicted in FIG. 4, these calculations are performed digitally. However, in both cases the coefficients have to be known, which can be obtained by applying a calibration procedure. Said calibration procedure can be performed by providing at least four different kinds of modulated signals at the five-port structure and using the same LO signal $S_2$ as in operation mode. The set of the modulated values comprises signals with different amplitudes and different phases at a specific carrier frequency $f_c$.

It should be noted that the calibration procedure and the set of used components are different for different operation frequencies f, and for different systems this procedure has to be done separately. This is especially true if the difference between two carrier frequencies $f_c$ is larger than 5%.

Furthermore, it should be noted that this procedure is valid for those RF or LO power levels where the power sensors PD1, PD2 and PD3 work as linear detectors. The calibration coefficients are obtained by solving four complex equations with four unknowns. Thereby, said calibration coefficients are more accurate if some sort of averaging with more than four complex values at the RF port is employed.

In the following sections, the simulation results of the calibration procedure described above shall be presented.

Figure 7:
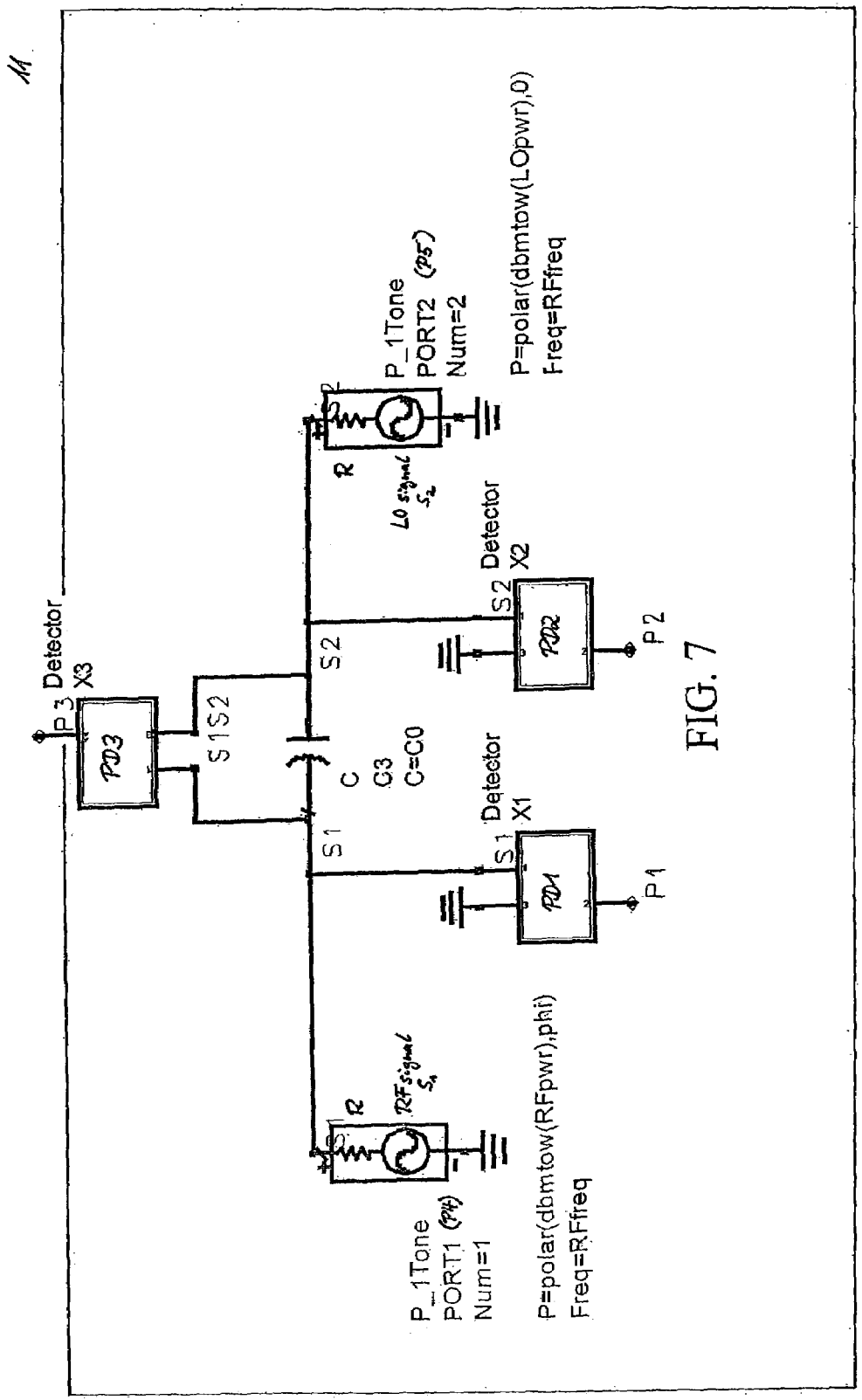
FIG. 7 presents a simulation topology for the underlying invention (cf.
Figure 8:
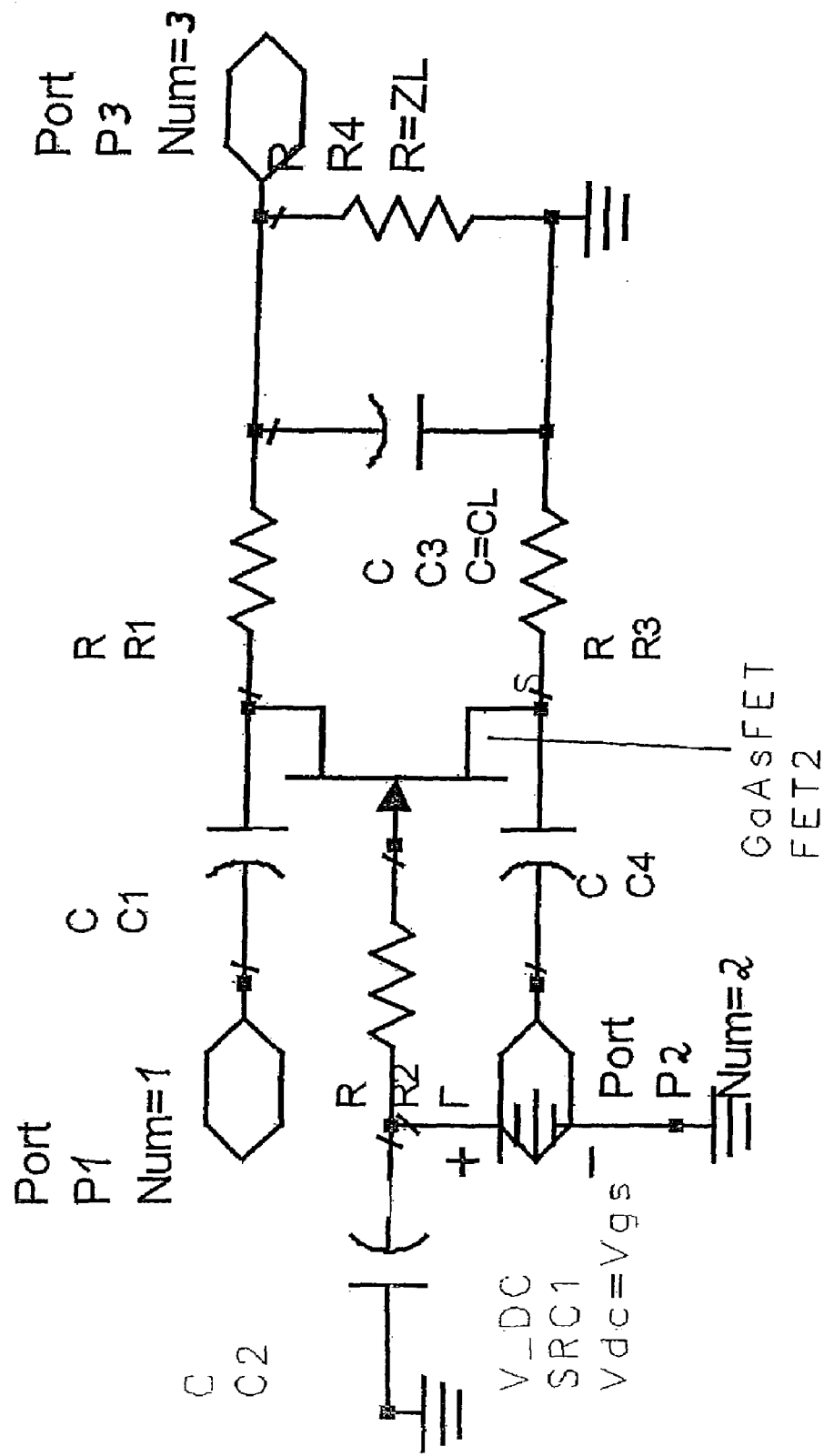
FIG. 8 shows the circuitry of the detector used for simulation purposes.

In FIG. 7, the topology which is used for the simulation of the proposed concept is shown. It can be seen that a capacitor $C_3$ of 1 pF is placed between the nodes A and B of the five-port junction device 11. As a power detector topology, the FET-type power detector PD3 depicted in FIG. 8 is used. In the case of power detector PD3, the active detector device is attached with two capacitors ($C_1$ and $C_2$), each having a value of 5 pF. The center frequency $f_c$ of the received PSK-modulated RF signal is in the frequency range of 5.5 GHz, for which the calibration procedure according to the above-described method of operation is applied.

Figure 9:
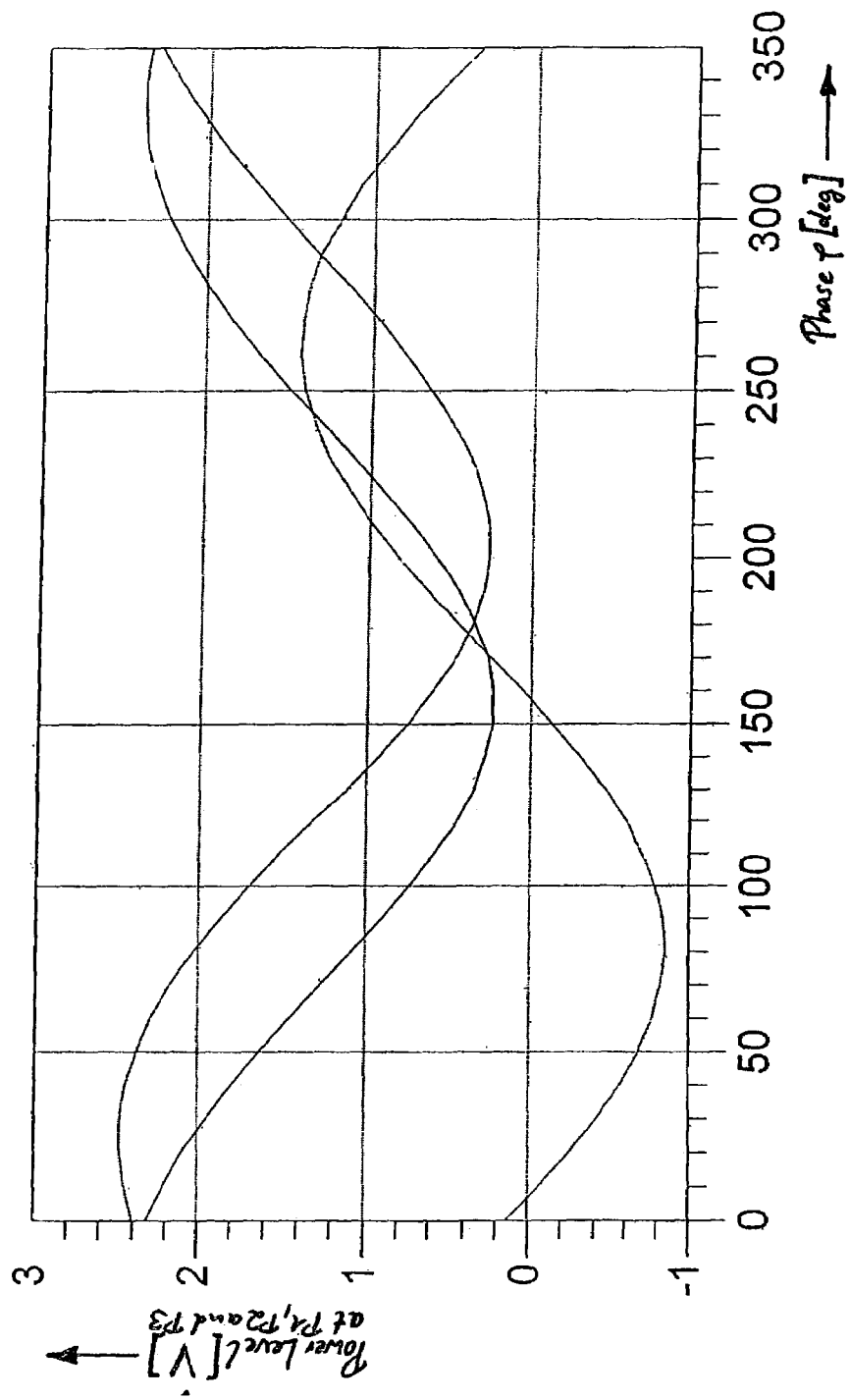
FIG. 9 shows the detected power levels at the output ports of the power detectors as depicted in FIGS. 6a–d.

In FIG. 9, the change of the power level at the three power detectors PD1, PD2 and PD3 over the signal phase φ can be observed, on the assumption that the RF signal is available at the input port P4 of the five-port junction device 11 with a constant amplitude. It can be observed that the power levels at the ports P1, P2 and P3 are changing periodically with the signal phase φ.

Figure 10:
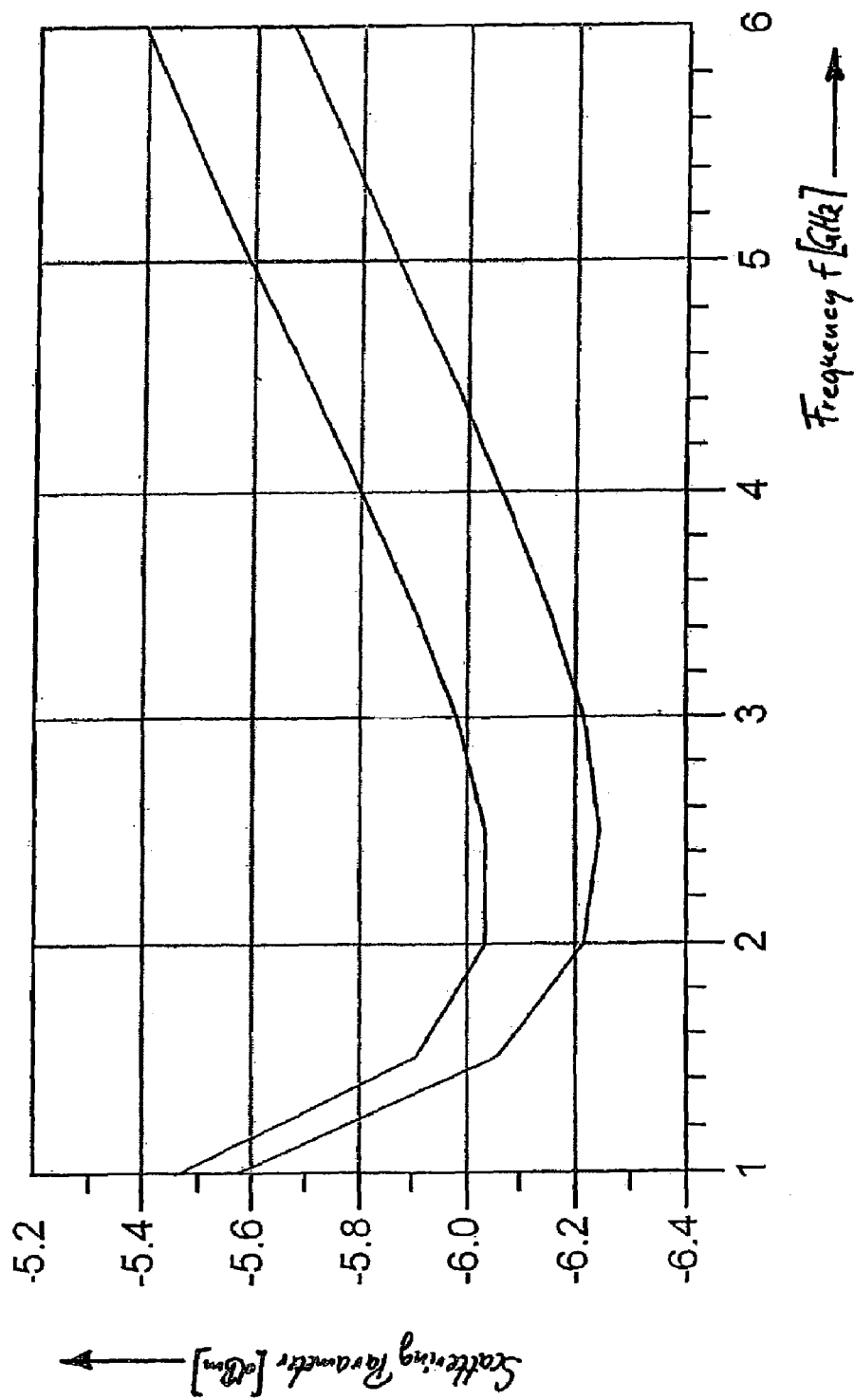
FIG. 10 shows the simulated scattering parameter status at the radio frequency (RF) and local oscillator (LO) input port, respectively.
Figure 11:
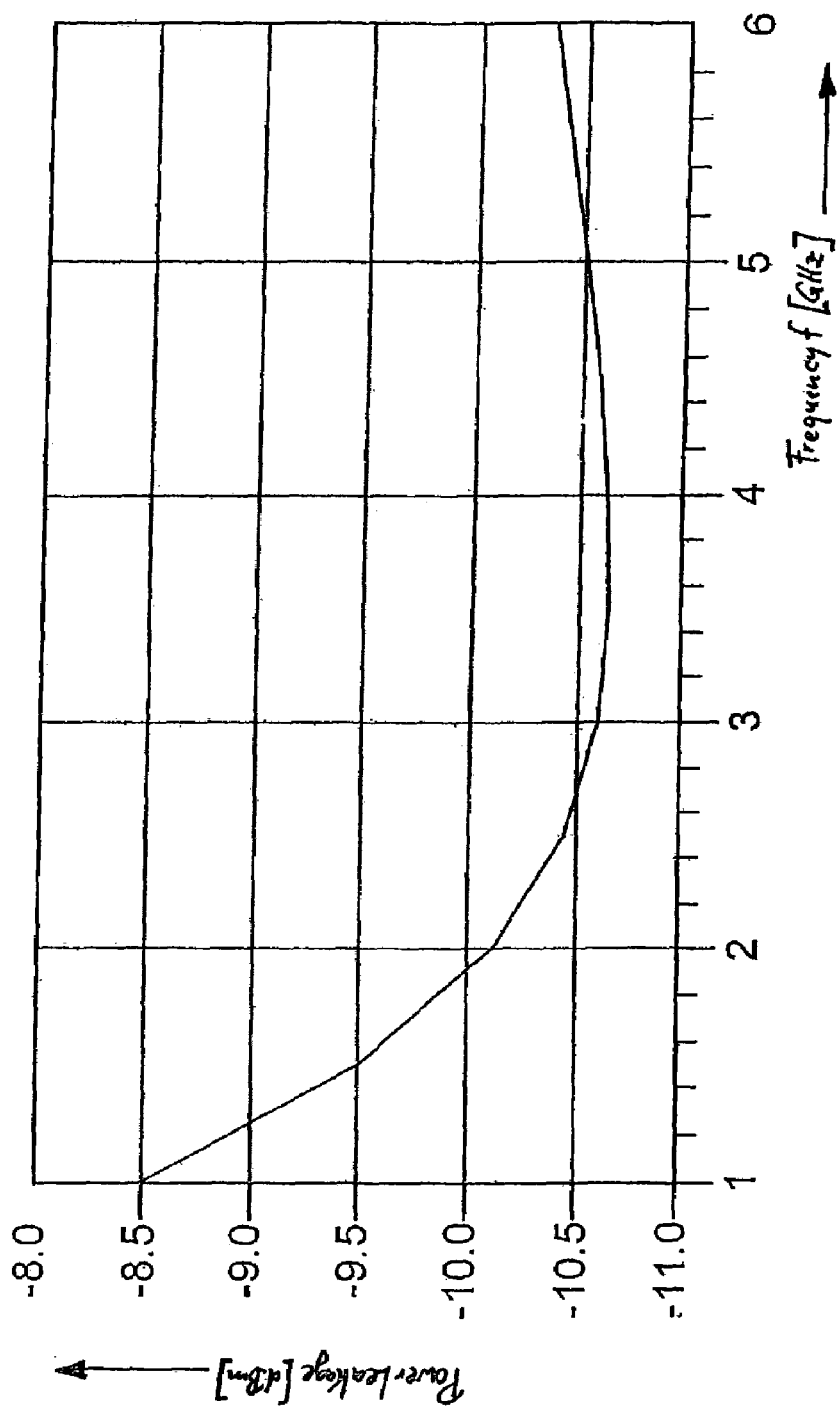
FIG. 11 shows the power leakage from the LO port to the RF port, FIG. 12 exhibits a known five-port topology according to the state of the art, which is used for comparison.
Figure 12:
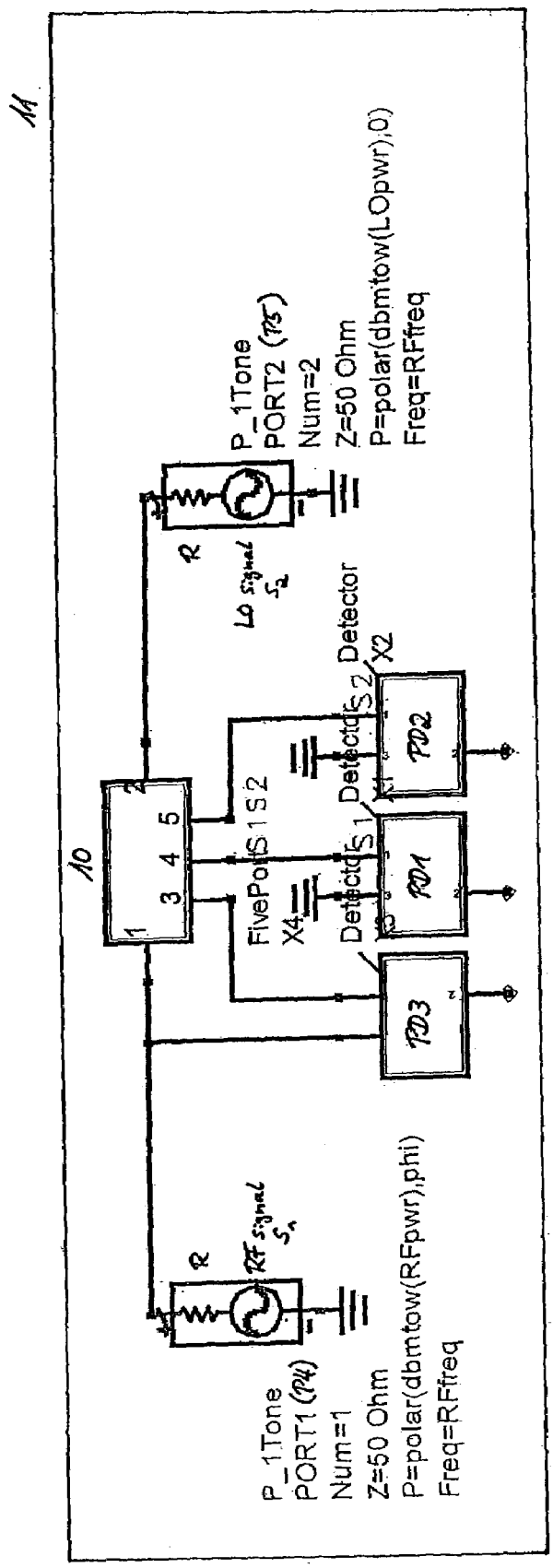

The input reflection losses of the simulated structure, which show a very braodband behavior, are depicted in FIG. 10. Despite the fact that the matching is not perfect (which means that there is no reactive matching since parts of the signal are reflected), the whole circuitry performs well. By contrast, the LO leakage does not play an important role in the process of said detection owing to the linear type of operation, the calibration procedure, and due to the fact that the LO signal level is very small compared to the classical mixer operation modus.

Figure 13:
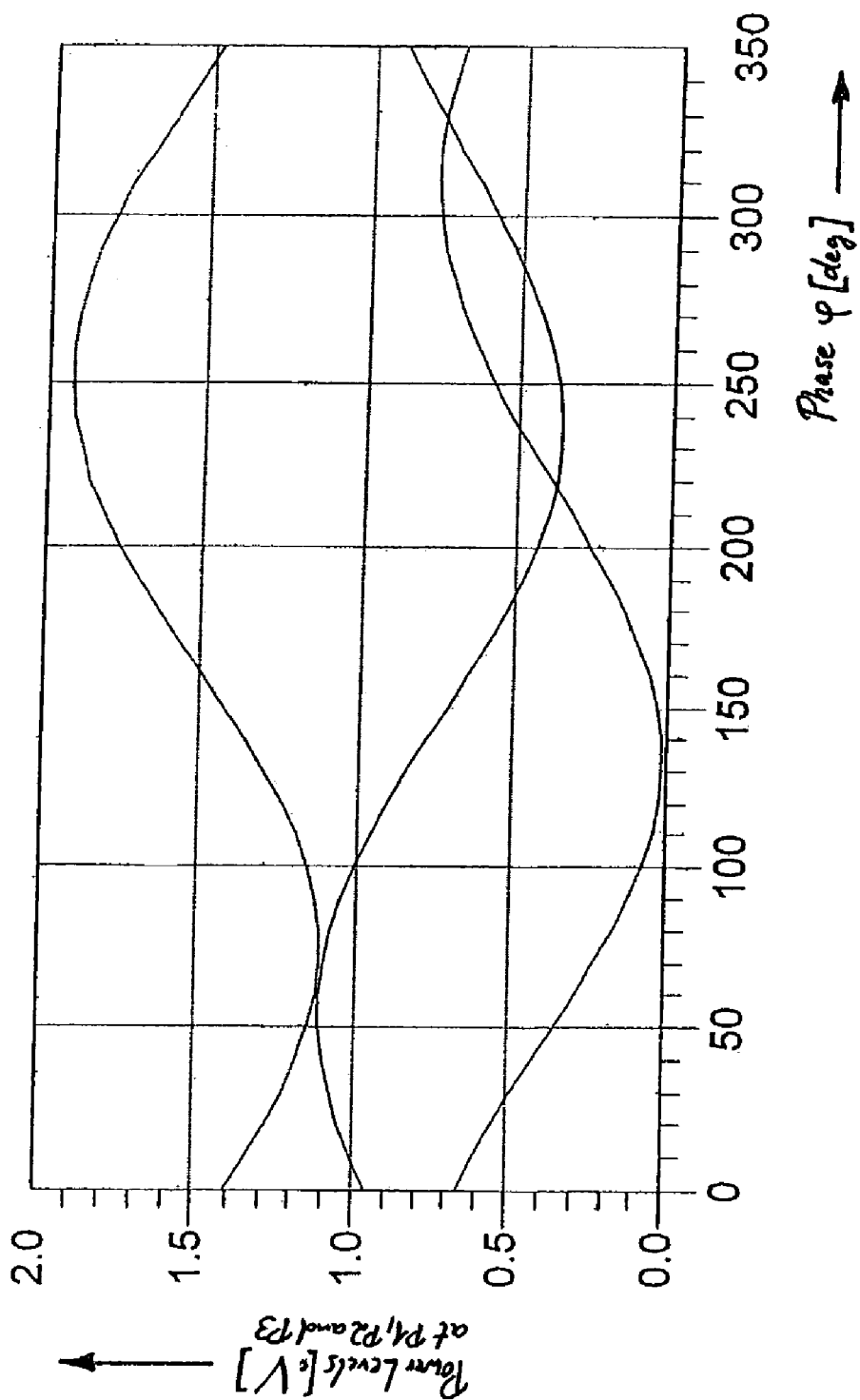
FIG. 13 shows the power levels measured at the power detector outputs, with the same input RF levels and the same LO level as in the simulation case of the underlying invention, and FIGS. 14a+b outline two I/Q diagrams of the demodulated signals (index: 'd') before and after having applied a calibration procedure, compared with the actually sent values of these signals (index: '0').

FIG. 13 shows the power level detected at the power detectors PD1, PD2 and PD3 in case of a conventional solution according to the state of the art.

By carefully checking the power levels depicted in FIG. 9 (for which the new proposed structure is used), comparing it with FIG. 13, and taking into account that the same power levels are used for both simulation cases, with the same LO level, it can be observed that the power characteristics of the signals measured at ports P1, P2 and P3 have peak-to-peak voltages which are twice as large as those depicted in FIG. 13. This result is obtained by having the same working conditions, in particular, the same input RF power and the same LO signal level. This means that the new structure, despite the impact of larger input reflection and a non-optimized architecture, involves an increase in sensitivity of 8–9 dB, compared to conventional solutions according to the state of the art.

The following table shows the sensitivity differences which can be observed:

| Power Reading No. | Voltage Peak-to-Peak (State of the Art) | Voltage Peak-to-Peak (New Solution) | Sensitivity Enhancement |
|---|---|---|---|
| 1 | approx. 0.8 mV | approx. 2.2 mV | approx. 9 dB |
| 2 | approx. 0.8 mV | approx. 2.2 mV | approx. 9 dB |
| 3 | approx. 0.8 mV | approx. 2 mV | approx. 8 dB |

It should be noted that better sensitivity gains may be accomplished by an optimization of the circuitry (realized by an internal matching of power detectors).

Furthermore, it can be seen that the new structure does not need additional resistive elements and/or phase shifters like conventional solutions according to the state of the art, which leads to a simple solution with a very small size suitable for an integration on a microchip 10. In total, nine resistors, one capacitor, and one inductor are omitted.

Moreover, the observation of the scattering lead to the conclusion that the proposed structure may be suitable for applications in a wide frequency band.

According to the simulation described above, it seems that applications between 1 GHz and 10 GHz may be feasible with the same five-port junction device 11. Of course, the calibration coefficients for said structure are different for different frequencies of operation, and have to be determined by I/Q calculation, regardless whether an analog or digital approach has been chosen.

Following the calibration procedure described above, the following coefficients are obtained and used for the calculation of the I/Q values:

$$\underline{h}_I := (h_{I0}, h_{I1}, h_{I2}, h_{I3})^T = \begin{pmatrix} -1.227490 \\ 0.143467 \\ 0.826963 \\ -0.285464 \end{pmatrix}, \text{ and}$$

$$\underline{h}_Q := (h_{Q0}, h_{Q1}, h_{Q2}, h_{Q3})^T = \begin{pmatrix} 0.177804 \\ 0.606288 \\ -0.684224 \\ -0.350902 \end{pmatrix}.$$

FIGS. 14a+b confirm the proposed design approach according to the underlying invention. They exhibit two I/Q diagrams of the demodulated signals (index: 'd') after having applied the proposed calibration procedure which yields ideal PSK signals at the input port P4 of the simulation structure, compared with the actually sent values of these signals (index: '0'). Thereby, coefficients for the −60 dBm and −10 dBm case (a dynamic range of approximately 50 dB) are used. It may be observed that at lower levels error increase which is expected.

The invention claimed is:

1. Device for a direct down-conversion of modulated RF signals, the device comprising:
    a first power detector connected between an input port for the modulated RF signal and ground, which outputs a first DC signal,
    a second power detector connected between an input port for a local oscillator signal and ground, which outputs a second DC signal, the local oscillator signal having the same center frequency as the modulated RF signal, and
    a third power detector connected between the input port for the modulated RF signal and the input port for the local oscillator signal, which outputs a third DC signal characterized in that a passive circuitry block is connected in parallel to the third power detector.

2. Device according to claim 1, characterized in that the passive circuitry block comprises at least one capacitor.

3. Device according to claim 2, characterized in that, the transmission line is placed externally to a microchip where the power detectors, the input ports and the output ports are integrated.

4. Device according to claim 1, characterized in that the passive circuitry block comprises at least one transmission line.

5. Device according to claim 1, characterized in that the passive circuitry block comprises and at least one active device providing a phase shift functionality.

6. Device according to claim 1, characterized in that the three output signals of the power detectors are supplied to a DC processing block.

7. Device according to claim 6, characterized in that the DC processing block comprises at least one amplifier and one low-pass filter for each output signal.

8. Device according to claim 7, characterized in that the amplifiers are variable gain amplifiers.

9. Device according to claims 6, characterized in that the DC processing block comprises
    one A/D converter for each output signal, respectively,
    a digital unit for an I/Q computation on the basis of the three digitalized output signals, and
    a demodulation unit.

* * * * *